United States Patent
Radatti

(10) Patent No.: US 7,502,939 B2
(45) Date of Patent: Mar. 10, 2009

(54) SOFTWARE VIRUS DETECTION METHODS AND APPARATUS

(75) Inventor: Peter V. Radatti, Conshohocken, PA (US)

(73) Assignee: CyberSoft, Inc., Conshohocken, PA (US)

(*) Notice: Subject to any disclaimer, the term of this patent is extended or adjusted under 35 U.S.C. 154(b) by 384 days.

(21) Appl. No.: 09/838,979

(22) Filed: Apr. 19, 2001

(65) Prior Publication Data

US 2002/0157008 A1 Oct. 24, 2002

(51) Int. Cl.
G06F 11/30 (2006.01)
(52) U.S. Cl. ............... 713/188; 726/24; 726/25
(58) Field of Classification Search ........ 713/188, 713/194; 726/24–25
See application file for complete search history.

(56) References Cited

U.S. PATENT DOCUMENTS 5,278,901 A * 1/1994 Shieh et al. ............... 713/200
6,851,057 B1 * 2/2005 Nachenberg ............... 726/24
2002/0073323 A1 * 6/2002 Jordan .................... 713/188

OTHER PUBLICATIONS

Afzal, Motorola PowerPC Migration Tools—Emulation and Translation, 1996, IEEE, p. 145.*
Davidson et al., "Cint: A RISC Interpreter for the C Programming Language," 1987, ACM, pp. 189-198.*

* cited by examiner

Primary Examiner—KimYen Vu
Assistant Examiner—Yogesh Paliwal
(74) Attorney, Agent, or Firm—John F. A. Earley, III; Frank J. Bonini, Jr.; Harding, Earley, Follmer & Frailey

(57) ABSTRACT

Software virus detection methods, apparatus and articles of manufacture are shown. In the preferred embodiments, these comprise review of proscribed code by an evaluative interpreter, which interprets the code in order to review the code for the presence of disguised viral or other code. The interpreted result is then first scanned for the presence of file open, or file modify or other instructions of interest, as well as scanned again for the presence of viral code signatures. The results are reported as desired.

6 Claims, 1 Drawing Sheet

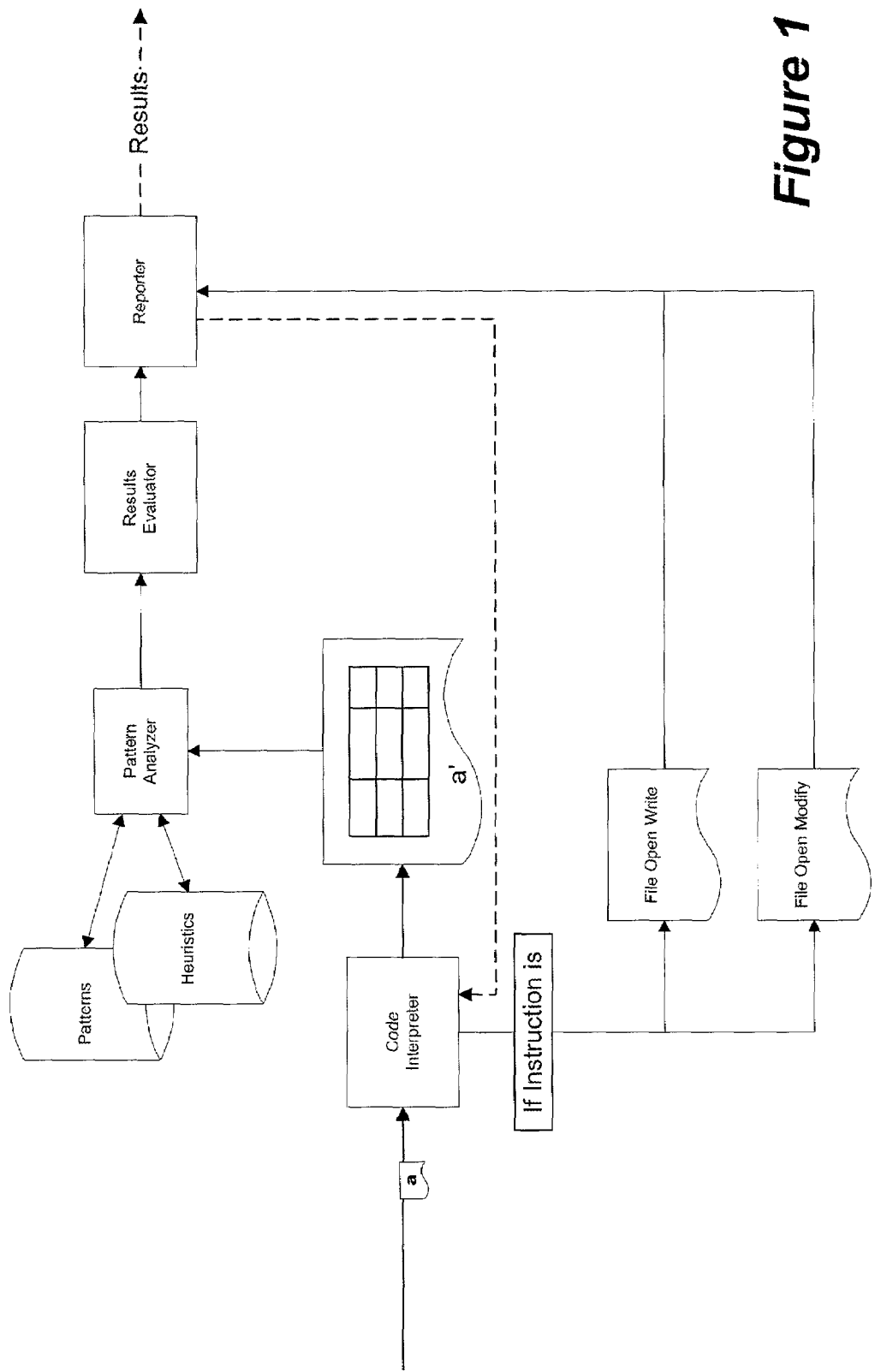

SOFTWARE VIRUS DETECTION METHODS AND APPARATUS

The present invention relates to software virus detection. More particularly, the present invention relates to the detection of disguised software viruses in proscribed code.

BACKGROUND OF THE INVENTION

The rise of the Internet and networking technologies has resulted in the widespread transfer of code, data and files between computers. This material is not always what it seems to be. For example, code that is accessed on a remote machine and downloaded to a computer system can contain hostile algorithms that can potentially destroy code, crash the system, corrupt code or worse. Computer viruses also spread through infecting other programs. For example, Visual Basic for Applications, or VBA, used in Microsoft's Office suite of products, provides a portal for virus entry through malicious use of VBA. Viruses, worms and other malicious programs and code can attack VBA compliant programs through the VBA portal. Moreover, Word or other VBA programs can, through infection by a certain type of malicious code, create a VBA virus: the malicious code may itself not be a virus but creates a virus and attack other VBA and non VBA programs on the user's machine as well. An early macro virus, W97M/Wazzu.A, operated by first infecting Word's default template normal.dot and spreading to each subsequent document.

Of course, malicious code is not limited to VBA compliant programs and may take many forms and infect many levels of the system's operation. Hostile, malicious and/or proscribed code, data and files ("code" as used hereinafter generally includes "data" and "files") can infect a single computer system or entire network and so posit a security risk to the computer system or network. The user and/or administrator (generally referred to hereinafter as "user") may wish to intercept, examine and/or control such code. The user might also wish to intercept, examine and/or control other code as well, for example, code which the user does not know to be hostile, but wishes to intercept nonetheless, for example, potentially sexually or racially harassing email, junk email, etc. This latter type of code is known hereinafter as "predetermined code".

Antivirus or other similar packages attempt to protect the system or network from hostile, malicious, predetermined and/or proscribed code (generally referred to hereinafter as "proscribed code.") VFIND®, from CyberSoft, Inc., is one such product that protects systems and networks from proscribed code.

Antivirus programs generally use two detection methods. The first detection method checks program code against a database of known virus code. This first detection method relies on automatic scanning, such as by scheduling, and/or manual scanning of the user's programs. The second detection method checks program code by heuristics, or approximate rules. Using a heuristics approach, it is not necessary to update a database, however, it is necessary to understand in advance the common approaches or attacks a virus may make on a computer system in order to construct the approximate rules.

Proscribed code is constantly being created. In order for a database antivirus program to be constantly effective, therefore, the antivirus database must be constantly updated to include new viruses. If the antivirus program relies on heuristics, those rules must be constantly verified to insure the new viruses are liable to be detected.

The utility of antivirus software therefore is limited because of the need to update antivirus database software and the need for constant verification of a heuristics database. Moreover, each of these methods of scanning for viral or malicious code usually presumes the code is present as a contiguous character string. Yet a malicious code creator may attempt to disguise the code by various methods in order to make the virus be a non contiguous character string or otherwise disguise the code. For example, the code creator can attempt to disguise the code through a number of methods, including providing code in a piecemeal format and subsequently having a program reassemble the code. Known code disguises include encrypted viruses, which include an encrypted virus and a decryption routine in their code body, polymorphic viruses, which generate decryption routines almost at random, armored viruses, and others. Combinations of these are also used. Once the program runs the disguised code, in the form of a macro or otherwise, the code is reassembled and the virus can attack the system.

Disguised code is usually undetectable to anti virus programs as the programs do not attempt to execute the code they are scanning but rather "passively" scan the code for the presence of proscribed code. Thus the proscribed code may successfully penetrate the target system.

Accordingly, it is an object of the present invention to provide methods and apparatus for disguised code detection.

It is a further object to simply and efficiently detect disguised code.

It is a further object to simply and efficiently detect viruses disguised code in VBA compliant programs.

It is a further object to detect viruses in VBA compliant programs automatically or virtually automatically so that little or no user interaction is required.

It is a further object to detect proscribed code in a network or enterprise environment.

SUMMARY OF THE INVENTION

The present invention comprises methods, apparatus and articles of manufacture for identifying, authenticating and securing code and providing proscribed code detection. In preferred embodiments, these systems and methods comprise code interpretation before the code is executed by the applications and/or the system. In some preferred embodiments, macro code is interpreted before the code is executed by any program.

DETAILED DESCRIPTION OF THE PREFERRED EMBODIMENTS

Proscribed code may be disguised by variable manipulation. For example, assume antivirus program A has, in its database of proscribed code, the listing of the pattern "VERYBADVIRUS" as proscribed code. A program or a VBA macro with the character string "VERYBADVIRUS" will be detected by the majority of prior art antivirus programs. These programs detect viruses by comparing the code of the suspected program against databases of known viral code and/or known viral patterns.

The proscribed code writer can attempt to bypass detection by an antivirus program. One technique is to break down the proscribed code into a number of pieces. Once the code is distributed and run by the victims the pieces will be reassembled and the proscribed code executed.

For example, assume proscribed code "VERYBADVIRUS" has been deliberately divided into a number of components by its author according to the following scheme:

SET X=VERY

SET Y=BAD

SET Z=VIRUS

ADD X+Y+Z

These components may then be deliberately buried in an otherwise harmless program by the writer and transferred to the targeted system, which reviews the otherwise harmless program with prior art antivirus program A. The proscribed code will evade detection even though the proscribed code components will be read by the prior art antivirus program A in the course of reviewing the otherwise harmless program. The proscribed code will evade detection by the antivirus program because the component character strings "VERY," "BAD," or "VIRUS" will not appear in an antivirus programs databases of known viral code or known viral patterns.

When the otherwise harmless program the proscribed code has been buried within is executed, the system will execute X+Y+Z and so "VERYBADVIRUS" will be executed. Thus, the code has been transferred into the target system and has evaded detection by an antivirus program.

Of course, proscribed code can be scrambled in other ways. As a further example, the above example could be further disguised by being scrambled before being finally assembled, such as by character substitution or other methods.

The present invention is designed to combat disguised code. The preferred embodiments interpret suspect code as part of a virus scanning engine by first interpreting the code. Unlike emulators, compilers and interpreters commonly used in the prior art which execute code as it is interpreted, however, the interpreter used in the preferred embodiments do not execute code. Rather the interpreter used in the preferred embodiments first summarily evaluates code and then writes the results to a results table for further evaluation. This process of the preferred embodiments results in detection of the results of the interpreted code. This review of these results in the table is an improvement over the emulators, compilers and interpreters used in the prior art process which detected the behavior of the code.

FIG. 1 shows an example of components of a preferred embodiment. Although the present invention can be implemented on various platforms, the preferred embodiments are used in Unix® and various Windows® environments, such as NT, 2000, 95, 98 and Me. It should be specifically understood that embodiments can be implemented in other Unix®-like platforms, including but not limited to Linux® and its variants, as well as other operating system platforms including but not limited to IBM OS/390, MacOS, VxWorks® and others.

The components of the preferred embodiment are provided within a virus scanner comprising a code interpreter, a results evaluator and a reporter. In other embodiments, these components, that is, the code interpreter, a results evaluator and a reporter may be implemented externally to a virus scanner, and embodiments may receive the code to be reviewed from any type of interface or feed. For example, embodiments of the present invention may interpret code at locations on a communications channel or layers in a communications stack.

The code interpreter has a number of facilities in order to interpret as many code formats and languages as desired in source or compiled form, including but not limited to VB or Java script, Java, Active X controls, BASIC, FORTRAN, Cobol, C, C++, Assembly, System binary, etc. In other embodiments the interpreter may only have a single dedicated language interpretive facility. These latter embodiments would be especially helpful where only one language is used in the system and speed is required.

The interpreter of the preferred embodiments is an evaluative interpreter. The interpreter reads and evaluates the code but writes the result to a table of interpreted results, which may be a buffer, or other memory. The interpreter does not execute the results. It is a limited interpreter. The interpreter reads code presented to it, but does not execute code, except for open file read calls in some preferred embodiments. If the interpreter were to execute the results of its interpretation, the virus code might actually be executed and thereby invade the target system. Additionally, use of an evaluative interpreter permits higher speed operation than might be the case if a standard executable interpreter were used. The use of an open read file call permits opening and review of files that may be associated with code, and so scan those files as well.

FIG. 1 shows code sequence a to be scanned. In order to scan code sequence a, the sequence may be held in a buffer and a copy made for scanning or the original code sequence may be transferred into the scanner. Once the code or its copy enters the scanner, it is first transferred to the interpreter.

The interpreter will interpret each line of the code. As it interprets the code, it will do a first scan for two instructions: file open write and file open modify. Either of these may be indicators of a virus, especially if the code being scanned is an executable file, as opposed to a word processing file. If either of those commands occur in the course of the scan, the scan will be stopped, a pointer set in the code sequence, an emergency flag set, and an emergency message sent to the reporter, which will then alert the user or administrator that an unauthorized operation is being attempted.

The reporting may, in other embodiments, not occur or occur in a different manner. For example, in some preferred embodiments, after receiving the emergency message, the reporter may hold the initial message pending the results of the finished interpretive scan. If the results of that scan, which occurs as explained below, are negative for the presence of a virus, then the reporter will reset the emergency flag.

Returning now to the embodiment of FIG. 1, the interpreter also proceeds to write the results of the interpretation to a table of results, held in a buffer. The contents of the table then undergo a second scan by the pattern analyzer for proscribed code. This scan is more comprehensive than the first summary instruction scan, and in the embodiment of the drawing, will be performed by examining the code against databases of known code patterns and heuristics. The databases, in some preferred embodiments, include virus code as well as the results of operations by virus code, i.e. certain results that are known to be created by virus code and that are statistically significant indicators of virus code. This latter data set is constructed in a separate operation or operations.

If the pattern analyzer detects virus code or code operations, it will notify the results evaluator either immediately, or in some embodiments, when it completes the analysis of the interpreted results. The results evaluator will notify the reporter, which, in turn, will notify the user or administrator of the results of the entire operation as appropriate. Of course, this reporting may or may not be performed, or may be performed in any of a number of manners such as writing to a log, a screen alert, etc.

It should be noted that, in other embodiments, the interpreter may not perform a first scan for file write or file modify commands, but may simply build the table for subsequent scanning. Additionally, in yet other embodiments, the interpreter's first scan may be for some other predetermined instructions, such as other instructions that may be high risk, or of interest for some other reason. Foe example, if the embodiment is scanning code for the presence of non viral but other proscribed code, then the initial scan might be for signature elements of that proscribed code. In general, in all embodiments, the interpreter's first scan is of very few commands, in order to minimize performance lag.

It should also be noted that the interpreter's scan could be code specific, by altering the first type of scan according to the code being scanned. For example, if the interpreter is of an embodiment that has various language specific interpreter facilities, and is called upon to interpret code, the type of code to be interpreted will determine the type of first scan to perform. For an executable, for example, both file open write and file open modify may be proscribed, while a word processing file may only implement a file open modify command scan. Similarly, a scan of VBA code may review the code against VBA viruses only.

In the preferred embodiments, the first scan, if it occurs, is performed on the results of the interpretation as it occurs, or, in some other embodiments, at the completion of the interpretation. The second scan is performed after the table of results has been constructed in order to most accurately scan the results of the interpretation. Of course, the second scan could occur in other embodiments as the interpreter builds the table in order to have the process finish quickly.

Preferred embodiments also interpret macro sequences in code before the macro is executed. Thus these macro embodiments will be implemented as the file containing macros is called by another file, such as when Word opens an emailed document with macros.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A software virus detection method, comprising:
   interpreting code that is suspected of containing proscribed code with an interpreter, wherein said interpreter includes a plurality of facilities for facilitating the interpretation of a plurality of code formats and languages in source or compiled form;
   evaluatively writing with said interpreter the results of said interpretation, wherein said results of said interpretation consist of a summarily evaluation of said suspect code;
   scanning the results of said interpretation for the presence of proscribed code and identifying proscribed code in said results, and making said results available to a reporter for reporting or to a processor for further processing of said results with a processing component;
   wherein the method includes ascertaining in said suspect code the presence of one or more instructions selected from the group consisting of file open write and file open modify;
   setting a pointer in a code sequence containing said one or more instructions;
   setting an emergency flag;
   sending to a reporter an emergency message; and
   communicating an alert from said reporter to a recipient.

2. The method of claim 1, including, when said reporter receives an emergency message, holding said emergency message as an initial message until completion of said scanning; and wherein when the results of said scan of said interpretation for the presence of proscribed code are negative, resetting said emergency flag.

3. The method of claim 1, wherein scanning for the presence of proscribed code of interest further comprises scanning for viral code or viral patterns.

4. A software virus detection apparatus comprising an article of manufacture including computer storage media that implements code, having:
   an evaluative code interpreter for interpreting code that is suspected of containing proscribed code, wherein said interpreter includes a plurality of facilities for facilitating the interpretation of a plurality of code formats and languages in source or compiled form;
   wherein said evaluative interpreter includes at least one facility for evaluatively writing with said interpreter the results of said interpretation, wherein said results of said interpretation consist of a summarily evaluation of said suspect code;
   a pattern analyzer for scanning the results of said interpretation for the presence of proscribed code;
   a results evaluator for identifying proscribed code in said results; and - a reporter; wherein said results evaluator makes results available to said reporter, wherein said reporter reports said results to a processor for further processing of said results with a processing component;
   wherein said evaluative code interpreter further reviews said code for ascertaining in said suspect code the presence of one or more instructions selected from the group consisting of file open write and file open modify;
   wherein said evaluative interpreter is configured to set a pointer in a code sequence containing said one or more instructions;
   wherein said evaluative interpreter is configured to set an emergency flag;
   wherein said evaluative interpreter is configured to send to a reporter an emergency message; and
   wherein said evaluative interpreter further comprising means for communicating an alert from said reporter to a recipient.

5. The method of claim 4, wherein said reporter is configured to receive an emergency message, and wherein said reporter is configured to hold said emergency message as an initial message until completion of said scanning; and wherein when the results of said scan of said interpretation for the presence of proscribed code are negative, resetting said emergency flag.

6. The apparatus of claim 4, wherein said pattern analyzer further reviews said code for the presence of viral code or viral patterns.

* * * * *